No. 820,560. PATENTED MAY 15, 1906.
F. A. EVANS.
ROTARY FILTER.
APPLICATION FILED APR. 29, 1905.

2 SHEETS—SHEET 1.

Witnesses.
A. H. Opsahl.
E. W. Jeppesen

Inventor.
Frank A. Evans.
By his Attorneys
Williamson & Merchant

No. 820,560. PATENTED MAY 15, 1906.
F. A. EVANS.
ROTARY FILTER.
APPLICATION FILED APR. 29, 1905.

2 SHEETS—SHEET 2.

Witnesses.
A. H. Opsahl.
E. W. Jespesen.

Inventor.
Frank A. Evans
By his Attorneys
Williamson Mucha

UNITED STATES PATENT OFFICE.

FRANK A. EVANS, OF REDWOOD FALLS, MINNESOTA.

ROTARY FILTER.

No. 820,560.            Specification of Letters Patent.            Patented May 15, 1906.

Application filed April 29, 1905. Serial No. 258,009.

*To all whom it may concern:*

Be it known that I, FRANK A. EVANS, a citizen of the United States, residing at Redwood Falls, in the county of Redwood and State of Minnesota, have invented certain new and useful Improvements in Rotary Filters; and I do hereby declare the following to be a full, clear, and exact description of the invention, such as will enable others skilled in the art to which it appertains to make and use the same.

My invention has for its object to provide a simple and highly efficient separator for separating liquids from granular or pulverized solid materials; and to these ends the invention consists of the novel devices and combinations of devices hereinafter described, and defined in the claims.

The improved device effects the separation of the liquid and solid matter by filtration, and hence from one point of view is a filtering device.

The improved separator is illustrated in the accompanying drawings, wherein like characters indicate like parts throughout the several views.

Figure 1:
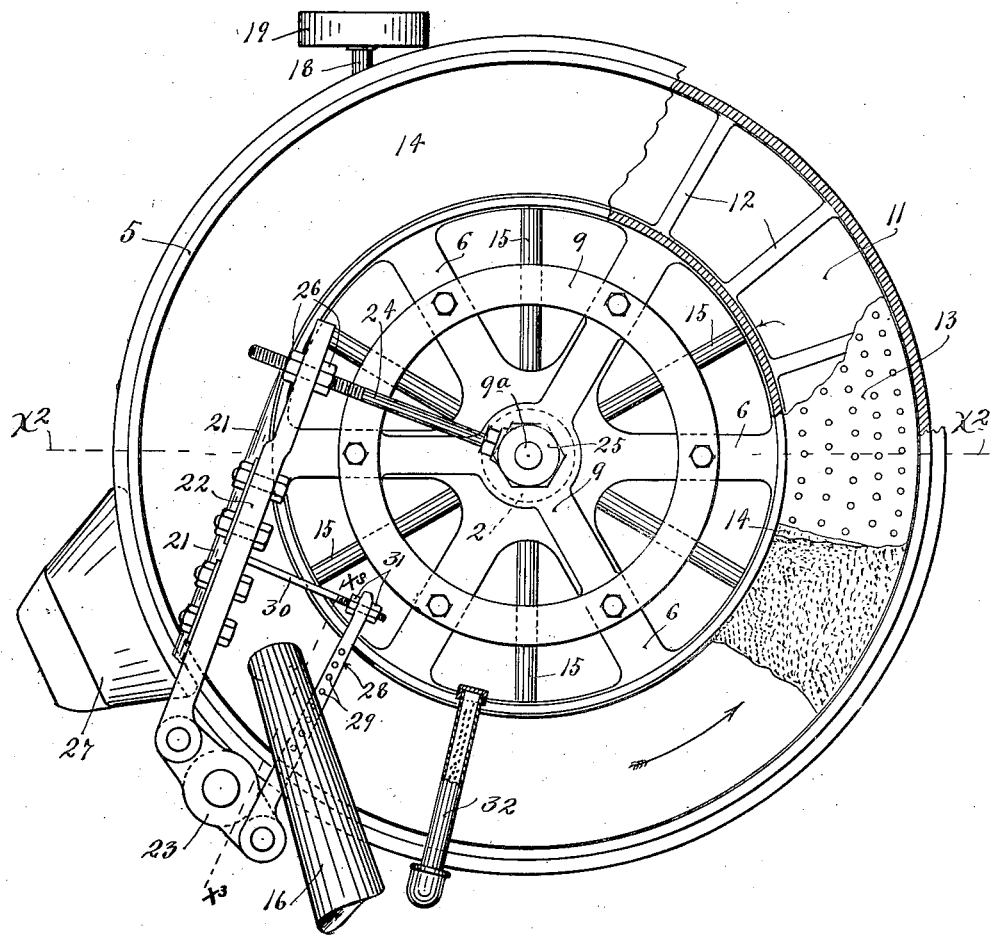
Figure 2:
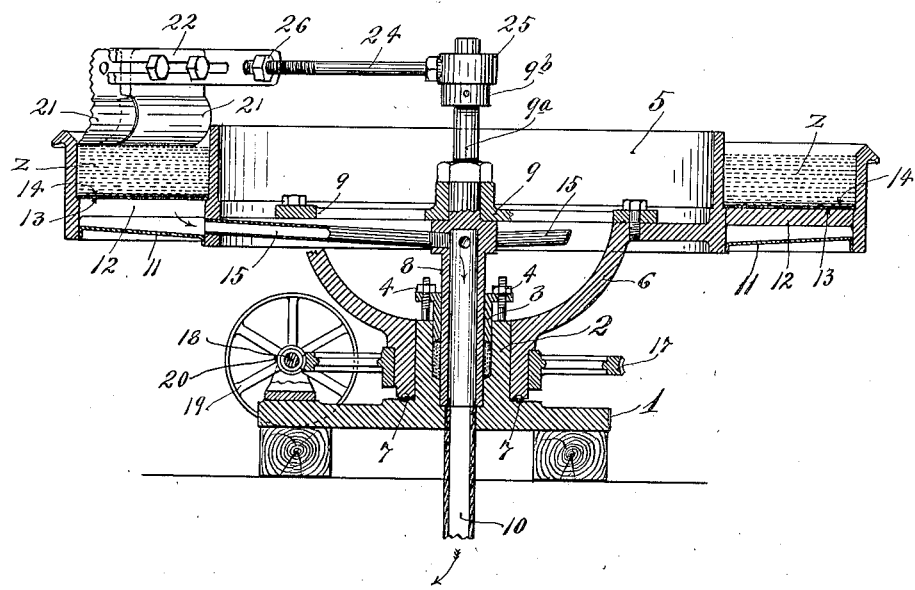
Figure 3:
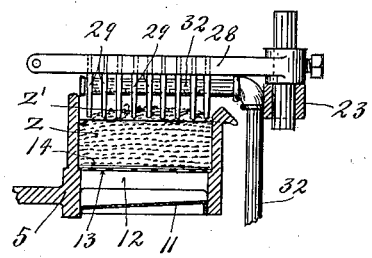

Figure 1 is a plan view with some parts broken away, showing the improved separator. Fig. 2 is a vertical section taken approximately on the line $x^2$ $x^2$ of Fig. 1; and Fig. 3 is a detail in vertical section taken approximately on the line $x^3$ $x^3$ of Fig. 1, some parts being removed.

The numeral 1 indicates a base-plate or support having an annular bearing-hub 2, within the cavity of which works a gland 3 of a stuffing-box, which gland is shown as subject to nutted studs 4.

The numeral 5 indicates an annular trough-like pan of a rotary filter. This pan is rigidly secured to the radial arms of a supporting-spider 6, the hub of which is loosely journaled on the bearing-sleeve 2 and, as shown, is directly supported by bearing-balls 7.

The numeral 8 indicates a vertically-disposed discharge-sleeve, the upper end of which is rigidly secured to a supplemental spider 9, which in turn is secured to the said spider 6. The upper end of the sleeve 8 is extended upward at $9^a$ to afford a bearing-post, and this extension is shown as provided with a supporting-collar $9^b$ for a purpose which will hereinafter appear. The sleeve 8 is thus mounted to rotate with the annular pan 5 and to work with a tight joint through the stuffing-box 3 and within the fixed bearing-hub 2. A discharge-pipe 10 is screwed into the bottom of the plate 1 and forms an extension of the rotary sleeve 8.

The washpan 5 is provided with an inwardly-inclined bottom plate 11, and above this bottom plate it is formed with short radial arms 12, that rigidly connect the inner and outer annular walls of the said pan 5. The arms 12 support a perforate or reticulate false bottom 13, upon which is preferably placed a layer of porous cloth 14. Upon the porous cloth 14 is placed a thick layer of filtering material, such as sharp sand or finely-pulverized rock $z$. It will be noted that the upper edge of the outer wall of the washpan 5 is made V shape or is brought to a sharp edge, and it will also be noted that this sharp edge is located considerably below the plane of the upper edge of the inner wall of said pan. Both of these features are important, as will presently appear.

The bottom of the annular pan 5 is in communication with the upper end of the discharge-sleeve 8 through a plurality of slightly-inclined drain-pipes 15.

The material to be filtered or washed will usually be delivered in a continuous stream onto the sand bed $z$ through a spout 16 or other suitable delivery device. The annular filter-pan 5 will be continuously rotated in a constant direction—as shown, for example, in Fig. 1 by the arrow marked thereon—through suitable driving mechanism, preferably comprising a worm-gear 17, rigidly on the hub of the spider 6, and a counter-shaft 18, having a belt-driven pulley 19 and a worm 20, the latter of which meshes into said worm-gear.

In front of the delivery end of the spout 16 is a plow-like scraper 21, which is made up of two overlapping sections adjustably secured to a bar 22, which bar in turn is pivotally connected at its outer end to a head 23, rigidly supported outside of the rotary filtering-pan 5. The inner end of the bar 22 is supported by a rod 24, provided at its inner end with a head 25, that rests loosely around the upper end of the stud $9^a$ and upon the collar 5$^b$ thereof. A threaded outer end of this rod 24 works through a perforation in the inner end of the bar 22 and is adjustably clamped thereto by nuts 26.

By adjustments of the free inner end of the bar 22 on the rod 24 the angle of the scraper 21 with respect to a line drawn radially from the axis of the rotary pan may be varied, and it will of course be understood that under different adjustments of said bar 22 sections of the scraper 21 should be adjusted so that they will engage at their ends both with the inner and outer walls of the said rotary pan.

The numeral 27 indicates a catch-spout, which is secured in a fixed position by any suitable means (not shown) and stands in position to receive materials scraped from the rotary pan by the scraper 21.

Rearward of the delivery end of the spout 16 is a rake made up of a bar 28 and depending teeth 29, which rake extends across the channel of the pan, with its teeth terminating slightly above the upper surface of the sand or filtering medium z. As shown, the outer end of the bar 28 is pivotally attached to the fixed head 23, while the inner end thereof is perforated to pass the end of the threaded rod 30. Said rod 30 is rigidly secured to the scraper-supporting bar 22, and on the threaded outer end of said rod is a pair of nuts 31, that clamp the front end of the bar 28 between them and adjustably hold said bar.

The numeral 32 indicates a spraying-pipe which extends across the channel of the pan 5 and is perforated at its under side, so that a spray of water discharging therefrom will be caught in the channel of the said rotary pan.

Operation: The device above described is capable of general use for separating liquid and solid materials. These liquids and solids may be delivered to the pan either commingled or they may be delivered thereto separately and commingle in the pan.

In using the device to reclaim cyanid of potassium from placer-sands or crushed rock the two may be delivered into the pan in a continuous stream through the spout 16, and under the rotation of the pan and under the action of the rake-teeth 29 they will be spread out in an even layer upon the upper surface of the sand filter z. In Fig. 3 the placer-sand is indicated by the character z'.

The filtering-pan 5 will in practice be made of large diameter and will be slowly rotated, so that the placer-sand or crushed rock will be carried for a considerable interval of time (usually from one to two minutes) before they are brought against the scraper 21 under the rotation of the pan. To wash the cyanid from the sand or crushed ore, it will usually be found desirable to turn on a spray of water from the pipe 32. Under the slow rotation of the pan the water and the cyanid of potassium, together with any metal held in the solution by the latter, will be given time to percolate or seep through the sand bed z onto the bottom 11 of said pan, from whence they may run through the drain-pipes 15 into the sleeve 8 and from thence out through the pipe 10 into some suitable receptacle. (Not shown in the drawings.)

Different conditions and kinds of solid materials which are being washed or separated from a liquid may require different angular adjustments of the scraper 21, and this is provided for by means already described.

From what has been said it will be seen that the device described is well adapted for use as a separator or filter for separating liquids from granular or pulverized solid materials in mining operations and that it affords efficient means for reclaiming and saving the water used in the washing process. The very great necessity for saving the water used in washing processes, so that the same may be used over and over again in mining districts where water is extremely scarce, is well known to miners working in arid districts. The device is also well adapted for use where the only function sought to be accomplished is the purification of water. The device therefore has a large range of utility. It also has an extremely high capacity for performing the work above described.

From what has been said it will be understood that the device described is capable of many modifications within the scope of my invention as herein set forth and claimed.

If desired, the discharge-pipe 10 may be in communication with a vacuum-pump, so that a vacuum or suction may be produced in the annular filtering-pan below the filtering medium to assist gravity and to accelerate the separation of the liquid from the solid material. The filter described is of course adapted for use for filtering various grades and kinds of material, from the very coarsest of earth-washing to the very finest of close filtering.

What I claim, and desire to secure by Letters Patent of the United States, is as follows:

1. The combination with a rotary annular filter, and means for supplying the solid and liquid materials thereto, of an adjustable scraper working over the upper open portion of said filter for scraping off therefrom, the solid materials from which the liquid has been drained, substantially as described.

2. The combination with a rotary annular filter and means for supplying the liquid and solid materials thereto, of a scraper mounted for longitudinal and angular adjustments and working over the open portion of said filter, for scraping therefrom the solid materials from which the liquid has been drained, substantially as described.

3. The combination with an annular filter and arranged for supplying the liquid and solid materials thereto, of an obliquely-set scraper, working over the upper open portion of said filter, and a rake or leveling device, working over the upper open portion of said filter, substantially as described In testimony whereof I affix my signature in presence of two witnesses.

FRANK A. EVANS.

Witnesses:
 GEO. L. EVANS,
 N. V. R. HUNTER.